(12) United States Patent
Lindstedt et al.

(10) Patent No.: US 10,899,119 B2
(45) Date of Patent: Jan. 26, 2021

(54) METHOD OF PRODUCING A PACKAGING MATERIAL FOR A RETORTABLE PACKAGE

(71) Applicant: TETRA LAVAL HOLDINGS & FINANCE S.A., Pully (CH)

(72) Inventors: Mikael Lindstedt, Malmö (SE); Johan Larsson, Gävle (SE); Helena Tufvesson, Gävle (SE); Anders Karlsson, Gävle (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 120 days.

(21) Appl. No.: 16/312,829

(22) PCT Filed: Jun. 21, 2017

(86) PCT No.: PCT/EP2017/065254
§ 371 (c)(1),
(2) Date: Dec. 21, 2018

(87) PCT Pub. No.: WO2017/220662
PCT Pub. Date: Dec. 28, 2017

(65) Prior Publication Data
US 2019/0322428 A1   Oct. 24, 2019

(30) Foreign Application Priority Data

Jun. 23, 2016 (EP) ..................... 16175961

(51) Int. Cl.
*B32B 27/30* (2006.01)
*C09D 7/61* (2018.01)
(Continued)

(52) U.S. Cl.
CPC ............ *B32B 27/308* (2013.01); *B32B 15/12* (2013.01); *B32B 15/20* (2013.01); *B65D 65/40* (2013.01);
(Continued)

(58) Field of Classification Search
CPC ....... B32B 27/308; B32B 15/12; B32B 15/20; B32B 2255/12; B32B 2255/20;
(Continued)

(56) References Cited

U.S. PATENT DOCUMENTS 6,852,422 B2   2/2005   Kendall et al.

FOREIGN PATENT DOCUMENTS

| CN | 101917860 A | 12/2010 |
|---|---|---|
| EP | 0590263 A2 | 6/2003 |

(Continued)

OTHER PUBLICATIONS

International Search Report and Written Opinion issued in corresponding International Patent Application No. PCT/EP2017/065254, 11 pages, dated Jul. 7, 2017.

*Primary Examiner* — Michael C Miggins
(74) *Attorney, Agent, or Firm* — Buchanan Ingersoll & Rooney PC

(57) ABSTRACT

The disclosure relates to a packaging material for a retortable package provided with decorative artwork, the packaging material having a pigment-coated paperboard material layer and outer, heat-resistant plastic coatings. In order to improve the printability of the paperboard layer, the surface of the coated paperboard layer intended for printing has a pigment coating composition comprising a pigment mixture, a binder and a zirconium based crosslinking agent, wherein the pigment mixture comprises at least 40 wt % calcium carbonate and at least 10 wt % clay.

22 Claims, 6 Drawing Sheets

Figure 1A:
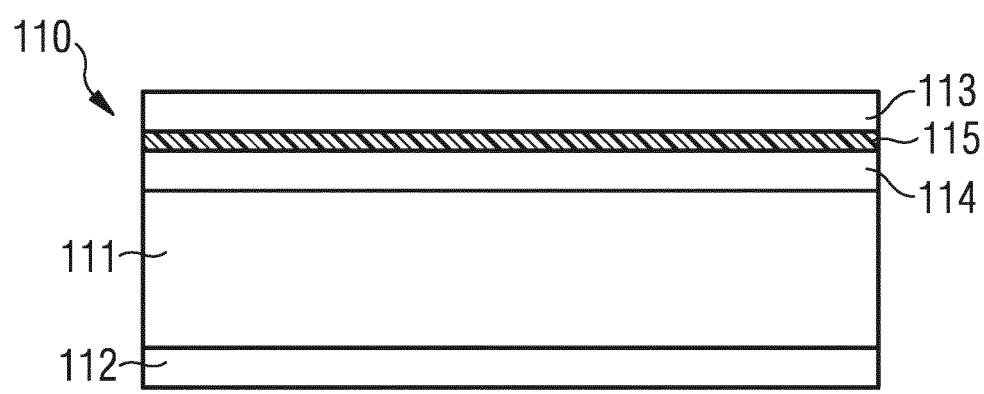

(51) Int. Cl.
  *B32B 15/12*      (2006.01)
  *B32B 15/20*      (2006.01)
  *B65D 65/40*     (2006.01)
  *D21H 19/38*     (2006.01)
  *D21H 19/40*     (2006.01)
  *D21H 19/58*     (2006.01)

(52) U.S. Cl.
  CPC .............. *C09D 7/61* (2018.01); *D21H 19/385* (2013.01); *D21H 19/40* (2013.01); *D21H 19/58* (2013.01); *B32B 2255/12* (2013.01); *B32B 2255/20* (2013.01); *B32B 2255/26* (2013.01); *B32B 2307/718* (2013.01); *B32B 2307/7244* (2013.01); *B32B 2439/62* (2013.01); *B32B 2439/70* (2013.01)

(58) Field of Classification Search
  CPC .......... B32B 2255/26; B32B 2307/718; B32B 2307/7244; B32B 2439/62; B32B 2439/70; C09D 7/61; D21H 19/385; D21H 19/40; D21H 19/58
  See application file for complete search history.

(56) References Cited

FOREIGN PATENT DOCUMENTS

| | | |
|---|---|---|
| JP | 2000052499 A | 2/2000 |
| WO | 2009055583 A1 | 4/2009 |
| WO | 2010114467 A1 | 10/2010 |
| WO | 2012044229 A1 | 4/2012 |

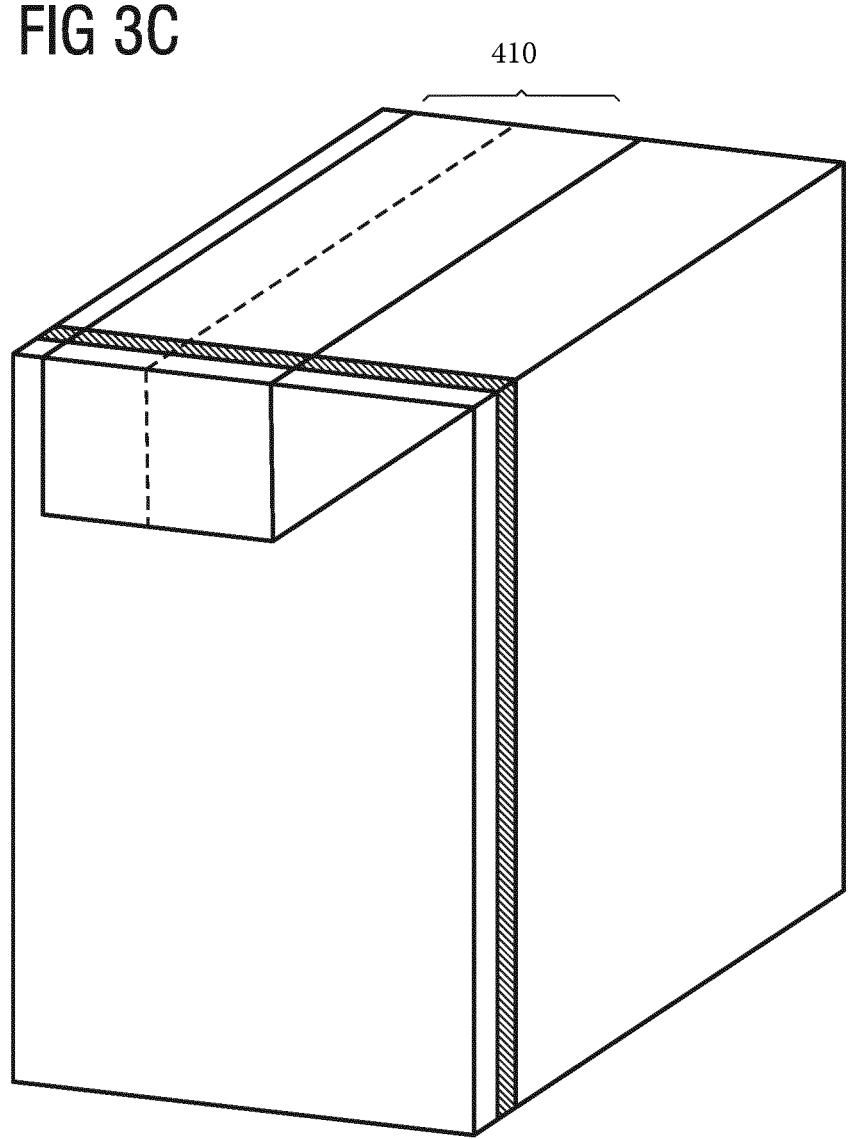

METHOD OF PRODUCING A PACKAGING MATERIAL FOR A RETORTABLE PACKAGE

TECHNICAL FIELD

The present invention relates to a packaging material for a package of the type which, after filling and sealing is, for purposes of extending shelf-life, intended to be subjected to a heat treatment at elevated temperature in an atmosphere of high relative humidity, the packaging material comprising a layer of paper whose one surface has a printable coating of pigment and binder, and decorative artwork of printing ink applied on the printable coating, as well as a recurring pattern of crease lines in register with said decorative artwork of printing ink.

The present invention also relates to a method of producing such a packaging material provided with decorative artwork for a package of the type which, after filling and sealing, is intended, for purposes of extending shelf-life, to be subjected to a heat treatment at elevated temperature in an atmosphere of high relative humidity, the method comprising the steps of providing a web of paper whose one surface has a printable coating of pigment and binder, providing the printable coating with optional decorative artwork of printing ink, and coating the web provided with decorative artwork with outer, heat-resistant coatings of plastic on both sides of the web.

The present invention moreover relates to a package produced by fold forming and thermosealing of the packaging material, the package being of the type which, after filling and sealing, is intended to be subjected, for purposes of extending shelf-life, to a heat treatment at elevated temperature in an atmosphere of high relative humidity.

BACKGROUND ART

Within packaging technology, use is often made of packages of a single-use disposable nature for packing and transporting foods. One very large group of these single-use disposable packages is produced from a packaging material comprising a layer of paperboard and outer, liquid-tight coatings of plastic. In order to impart to the packaging material superior tightness properties vis-à-vis gases, in particular oxygen gas, the packaging material is supplemented with at least one additional layer of a material possessing such tightness properties, normally an aluminium foil (Alifoil).

From the prior art packaging material, packages are produced using modern packing and filling machines which, from a web or from prefabricated blanks of the packaging material, both form, fill and seal finished packages.

From, for example, a web, packages are produced in that the web is first reformed into a tube by both longitudinal edges of the web being folded towards and united to one another in a mechanically strong and liquid-tight sealing joint ("overlap joint"). The tube is filled with an optional food and is divided into cushion-shaped packaging units by repeated transverse sealing of the tube transversely of the longitudinal axis of the tube and beneath the filling level of the tube. The packaging units are separated from one another by incisions in the transverse sealing zones and are given the desired geometric outer configuration, normally parallelepipedic, by an additional fold forming and thermosealing operation.

Correspondingly, packages are produced from flat-folded tubular blanks of the packaging material. The flat-folded blank is raised to an open packaging carton whose one end (e.g. the bottom end) is sealed by fold forming and thermosealing of the continuous foldable bottom panels of the packaging carton. The packaging carton thus provided with a bottom is filled with food product, and thereafter the open end of the packaging carton (in this example the top end) is sealed by fold forming and thermosealing of the corresponding foldable top panels of the packaging carton.

On the market today, there occur such packages of a single-use disposable nature in an almost insurmountably large multiplicity of packaging variations for an almost equally insurmountably large multiplicity of foods, from liquid to solid and semi-solid foods.

One large group of commercial single-use disposable packages comprises so-called aseptic packages in which a previously sterilized food is packed in a similarly previously sterilized package under aseptic conditions. The aseptic package distinguishes itself in that the food may be stored in the package for up to months and even longer at ambient temperature, without the food deteriorating or being ruined. For some food products with further desired extended shelf life, the filled and sealed package needs to be kept at an elevated high temperature for some time after filling, in order to completely sterilize the food product and the package together. This sterilisation method is generally called "hot fill with pasteurisation" and may be sufficient for some food products which are of a semi-liquid or semi-solid character, for which retort sterilization treatment would be too harsh a treatment, but for which on the other hand normal pasteurisation before filling would be insufficient. Heat treatment at a temperature below 100° C. is sometimes referred to as pasteurization.

Another group of prior art single-use disposable packages comprises packages in which the food must, throughout its entire storage time in the package, be kept refrigerated (at at most approx. +8° C.) in order not to deteriorate or be completely ruined before its "best before date".

A further group of such single-use disposable packages comprises so-called retortable packages which are intended to be filled with food and, after sealing, be subjected to a heat treatment for the purposes of extending shelf-life at elevated temperature in an atmosphere of high relative humidity. Like the aseptic packages, the retortable packages have the capability of being able to store the packed food for several months and even longer at ambient temperature without the food deteriorating or being ruined before its "best before date".

A packaging material of the type described by way of introduction is produced in a per se known manner in that a web of paper or paperboard is unwound from a magazine reel. The web is led to a printing station where the one side of the web is provided with optional decorative artwork of printing ink and, at the same time, is provided with a corresponding pattern of crease lines in register with the decorative artwork.

Since paper and paperboard generally displays a coarse and uneven surface characteristic which impairs the printability of the paper surface, and thereby makes it difficult to ensure a good and even quality of decorative artwork, the paper surface is right from the outset provided with a smooth coating which improves printability. Examples of such printability-improving coatings are well-known to a person skilled in the art and in general consist of a combination of pigment and binder.

The web provided with decorative artwork and crease lines is led further to a lamination station where both sides of the web are provided with outer, liquid-tight coatings of plastic by extrusion. One typical example of a prior art such extruded coating is polyethylene.

If the packaging material is intended for a package for particularly oxygen gas-sensitive foods, such as juice, wine or cooking oil, the web is moreover provided with a layer serving as oxygen gas barrier, normally an aluminium foil, which is laminated to the web between the paper layer of the web and one of the two outer, liquid-tight coatings.

The laminated web is led further to one or more mechanical processing stations where the web is cut into suitable dimensions and detected faults on the web are removed, before the web is finally wound up into finished, customer-adapted transport reels.

In the prior art method, packaging material is produced for both aseptic packages and for packages in which a packed food must be kept refrigerated throughout its entire storage life up to the moment of consumption ("best before date"). On the other hand, attempts by such means to produce a packaging material for so-called retortable packages have often failed. One drawback which has been observed in connection with a package of the packaging material being subjected to a heat treatment at elevated temperature in an atmosphere of high relative humidity (such as in a steam retort) is that the decorative artwork of the package becomes damaged under these conditions and has thereby rendered the appearance of the package unsightly and unattractive. In some cases, cracks and crack formation related to heat and humidity in the pigment coating of the packaging material, which pigment coating is carrying the decorative artwork, have been noted. In a worst case, the mechanical firmness and stability of the package may be deteriorated. These problems may be further aggravated in those cases when a retortable package, during the heat treatment for extending shelf-life is at the same time subjected to high pressure in a retort.

WO 2010/114467 and WO 2012/044229 address the problem of providing producing pigment coated paperboard for incorporation into laminated packaging material that can withstand steam sterilization. The suggested solution to the problem is a hydrophobized paperboard coated with a composition comprising calcium carbonate pigment, a binder and a rheology modifier.

It has, however, been noted that the print appearance after steam sterilization of printed and laminated paperboard according to WO 2010/114467 and WO 2012/044229, although improved, has still been unsatisfactory.

After fold forming, filling and heat treatment, at visual inspection, it still happens that defects, such as contrast differences, believed to be caused by cracks or cohesive failures within the ink layer, are perceived.

SUMMARY

One object is therefore to satisfy the above-described further needs in the art.

A further object is to realise a packaging material provided with decorative artwork for a retortable package, the packaging material comprising a layer of paper or paperboard whose one surface has a printability-improving coating of pigment on which is printed optional decorative artwork of printing ink, as well as outer, thermo-sealable heat-resistant coatings of plastic, without accompanying problems and drawbacks of the type which are associated with the prior art packaging material.

Accordingly, it is an object of the present disclosure to preserve the appearance of a printed decorative artwork on pigment-coated paperboard in such a laminated packaging material during steam and/or hot liquid sterilization of a packaging container made thereof.

Further, it has been noted that some pigment-coated and printed paperboard yellows, in a laminated packaging material during steam sterilization of a packaging container made thereof, resulting in less appealing packages.

Accordingly, it is an object of some embodiments of the present disclosure to also prevent yellowing of pigment-coated and printed paperboard in a laminated packaging material during steam sterilization of a packaging container made thereof, and to provide said packaging material.

Yet a further object of the present invention is to realise a method for manufacturing of the packaging material described above, which also makes for the production of a well-functioning packaging material for a package of the type which, after filling and sealing, is, for purposes of extending shelf-life, intended to be subjected to a heat treatment at elevated temperature in an atmosphere of high relative humidity.

A particular object of the present invention is to realise a method of the type described by way of introduction which also makes for the production of a well-functioning packaging material for a package of the type which, after filling and sealing, is, for purposes of extending shelf-life, intended to be subjected to a heat treatment at elevated temperature and high pressure in an atmosphere of high relative humidity.

Still a further object of the present invention is to realise a package produced by forming and thermo-sealing of the packaging material according to the present disclosure which may be subjected to heat treatment at elevated temperature in an atmosphere of high relative humidity, without accompanying problems of the type which occur in the prior art technology.

Still a further object of the present invention is to realise a package produced by forming and thermo-sealing of the packaging material according to the present disclosure which may be subjected to a heat treatment at elevated temperature and high pressure in an atmosphere of high relative humidity, without accompanying problems of the type which occur in the prior art technology.

The following itemized listing presents various embodiments of the present disclosure as well as their combinations.

1. A packaging material for a package of the type which is produced by forming and thermo-sealing and which, after filling and sealing is, for purposes of extending shelf-life, intended to be subjected to a heat treatment at elevated temperature, the packaging material (21; 31) including a layer of a coated paperboard material, which is further laminated to outermost layers of plastics, wherein the coated paperboard material comprises a base board having a top side provided with a pigment coating to form a surface for printing, which pigment coating comprises a pigment mixture, at least one binder and a zirconium-based cross-linker, wherein the pigment mixture comprises at least 40 wt-% calcium carbonate and at least 10 wt-% clay, such as kaolin clay, such as delaminated clay.
2. The packaging material according to item 1, wherein the coated paperboard material has a base board which comprises at least two paper layers and wherein a top paper layer of the base board is provided with the pigment coating.
3. The packaging material according to item 2, wherein the top paper layer of the base board is bleached and optionally comprises titanium dioxide.

4. The packaging material of item 2 or 3, wherein the top layer is formed from Kraft pulp, such as bleached Kraft pulp.
5. The packaging material according to any one of items 2-4, wherein the base board comprises a bottom paper layer formed from unbleached pulp.
6. The packaging material according to any one of the previous items, wherein the grammage (ISO 536) of the base board is between 70 and 290 g/m$^2$, such as 120 and 290 g/m$^2$, such as between 160 and 290 g/m$^2$, such as between 190 and 250 g/m$^2$, such as between 210 and 250 g/m$^2$.
7. The packaging material according to any one of the previous items, wherein the thickness (ISO 534) of the base board is between 230 and 390 μm, such as between 255 and 325 μm.
8. The packaging material according to any one of the previous items, wherein the density (ISO 534) of the base board is between 600 and 900 kg/m$^3$, such as between 650 and 850 kg/m$^3$, such as between 680 and 810 kg/m$^3$, such as between 700 and 780 kg/m$^3$.
9. The packaging material according to any one of the previous items wherein the coated paperboard has a grammage (ISO 536) between 150 and 300 g/m$^2$, such as between 200 and 300 g/m$^2$, such as between 220 and 270 g/m$^2$.
10. The packaging material according to any one of the previous items wherein the coated paperboard has a thickness (ISO 534) between 230 and 400 μm, such as between 255 and 325 μm.
11. The packaging material according to any one of the previous items wherein the coated paperboard has a density (ISO 534) between 700 and 950 kg/m$^3$, such as between 800 and 920 kg/m$^3$, such as between 800 and 880 kg/m$^3$, such as between 820 and 890 kg/m$^3$, such as between 820 and 860 kg/m$^3$.
12. The packaging material according to any one of the previous items, wherein the coat weight of the pigment coating on the top side is 5-30 g/m$^2$, such as 8-30 m$^2$, such as 10-30 m$^2$, such as 17-23 g/m$^2$.
13. The packaging material according to any one of the previous items, wherein a reverse side of the base board is provided with the pigment coating, which optionally lacks the zirconium-based cross-linker.
14. The packaging material according to item 13, wherein the coat weight on the reverse side of the base board has a coat weight of 1-30 g/m$^2$, such as 1-9 g/m$^2$, such as 3-8 g/m$^2$.
15. The packaging material according to any one of the previous items, wherein the pigment mixture amounts to 75-95%, such as 80-88%, of the dry weight of the pigment coating.
16. The packaging material according to any one of the previous items, wherein the at least one binder amounts to 10-20%, such as 12-18%, of the dry weight of the pigment coating.
17. The packaging material according to any one of the previous items, wherein the zirconium-based cross-linker amounts to 0.3-3%, such as 0.6-1.5%, such as 0.75-1.0% of the dry weight of the pigment coating.
18. The packaging material according to any one of the previous claims, wherein a pre-coating is provided between the top side of the base board and the pigment coatingforming the surface for printing.
19. The packaging material according to any one of the previous items, wherein the pigment coating further comprises at least one rheology modifier.
20. The packaging material according to item 19, wherein the at least one rheology modifier amounts to 0.05-2.0%, such as 0.1-1.0%, of the dry weight of the pigment coating.
21. The packaging material according to item 19 or 20, wherein the at least one rheology modifier is CMC or an acrylic co-polymer, such as an alkali-swellable acrylate polymer.
22. The packaging material according to any one of the previous items, wherein the base board is hydrophobized from a sizing agent treatment, such as treatment with alkyl ketene dimer (AKD), alkenyl succinic anhydride (ASA) or a combination thereof
23. The packaging material according to any one of the previous items, wherein the pigment mixture further comprises layered silicate mineral, hydrated magnesium silicate, titanium dioxide or satin white.
24. The packaging material according to any one of the previous items, wherein the pigment mixture comprises at least 50 wt-% calcium carbonate and at least 15 wt. % clay.
25. The packaging material according to any one of the previous items, wherein the zirconium-based cross-linker is a zirconium carbonate, such as ammonium zirconium carbonate or potassium zirconium carbonate.
26. The packaging material according to any one of the previous items, wherein the at least one binder is/are selected from the group consisting of co-polymers, acrylic resins, polyvinyl acetate, polyvinyl alcohol, proteins, and polysaccharides, such as starches.
27. The packaging material according to any one of the previous items, wherein the at least one binder is/are selected from synthetic co-polymers, such as acrylic co-polymers, styrene-butadiene co-polymers and methyl methacrylate-butadiene co-polymers.
28. The packaging material according to any one of the previous items, wherein the at least one binder is a styrene/acrylate co-polymer.
29. The packaging material according to any one of the previous items, wherein the base board comprises 2, 3 or 4 paper layers.
30. The packaging material according to any one of the previous items, wherein the top side coated with the pigment coatingsurface for printing is printed with a decorative artwork of printing ink.
31. The packaging material according to item 30, wherein the coated paperboard material has a recurring pattern of crease lines in register with said decorative artwork of printing ink.
32. The packaging material according to any one of items 30-31, wherein it further includes at least one layer serving as a gas barrier, such as an aluminium foil.
33. The packaging material according to any one of items 30-32, wherein it includes a combination of two or more layers of such gas barrier materials, of which one is an aluminium foil.
34. The packaging material according to any of items 30-33, wherein an aluminium foil is laminated to the coated paperboard material by means of an interjacent bonding layer of plastics.
35. A package adapted for a sterilizing heat treatment, which is produced from a packaging material as defined in any one of items 1-34, such as by forming and thermosealing of the packaging material.
36. A package according to item 35 adapted for co-sterilization of the package and its contents.

37. A package according to any one of items 35 or 36, adapted for a shelf-life extending heat treatment with steam as the heat medium.
38. A retortable package according to any one of items 35-37.
39. A package for a sterilizing heat treatment comprising the packaging material according to any one of items 1-34, adapted for printing by for example flexography, offset and lithography printing techniques.
40. A method for producing a packaging material including a coated paperboard material as defined in anyone of items 1-34, comprising applying a pigment coating composition on a top side of a base board, which top side is optionally coated with a pre-coating, wherein the pigment coating composition comprises a pigment mixture, at least one binder and a zirconium-based cross-linker, the pigment mixture comprising at least 40 wt-% calcium carbonate and at least 10 wt-% clay, and the method further comprising applying outermost layers of plastics.
41. A method according to item 40, further comprising a step, after applying the pigment coating composition, of providing the coated paperboard material with a decorative artwork by a printing technique.
42. A method according to item 41, wherein the coated paperboard material printed with a decorative artwork is in a further step provided with a recurring pattern of crease lines in register with the printed decorative artwork.
43. A method according to any one of items 40-42, wherein the coated paperboard material is in a further step laminated to a layer serving as a gas barrier layer.
44. A method according to item 43, wherein the gas barrier layer is an aluminium foil.
45. A method according to any one of items 40-44, wherein the step of applying the outermost heat-resistant layers of plastics is carried out by means of extrusion coating onto a web comprising the layer of a coated paperboard material.
46. A method according to any one of items 42-45, wherein the step of laminating the coated paperboard material to a layer serving as a gas barrier layer, is carried out by melt extrusion laminating with an interjacent layer of thermoplastics.

DETAILED DESCRIPTION

According to a first aspect, there will thus be realised a packaging material for a package which is produced by forming and thermo-sealing, and which, after filling and sealing is, for purposes of extending shelf-life, adapted for a sterilizing heat treatment at elevated temperature, such as for example a treatment with steam, water or steam-water mixture as the heat medium, such as a retort or autoclave treatment with hot steam and/or water at elevated pressure. The packaging material includes a layer of a coated paperboard material, comprising a base board having a top side provided with a printable pigment coating forming a surface for printing, and a decorative artwork of printing ink being applied on the pigment coating. The printable pigment coating comprises a pigment mixture, at least one binder and a zirconium-based cross-linker, wherein the pigment mixture comprises at least 40 wt-% calcium carbonate and at least 10 wt-% clay, such as kaolin clay, such as delaminated clay. A pre-coating layer may be provided between the top side of the base board and the pigment coating.

According to the present disclosure, it has surprisingly been observed that a package produced from the packaging material, which has been filled with food and thereafter sealed, may very well be subjected to a heat treatment for purposes of extending its shelf-life, without the package being damaged or destroyed. In particular, it has proved that a package produced by fold forming and thermo-sealing of the packaging material according to the present invention withstands such a heat treatment at elevated temperature, without the decorative artwork or mechanical firmness and dimensional stability of the package deteriorating because of the severe action of heat and humidity. On a visual inspection of heat treated packages, neither moisture- nor heat-related cracks or crack formations in the printable pigment coating of the packaging material, nor substantial defects in the decorative artwork of printing ink applied there onto, have been observed, but both the package and the packaging material in the heat treated package were practically unaffected and intact after the severe heat treatment.

It is believed that defects perceived as visual contrast differences in the printed decorative artwork, are caused by cohesive break in the ink layer, in turn caused by swelling and contraction of the cellulose fibre structure of the paperboard during the heat treatment and after cooling/drying, which also induces forces in the interface between the paperboard and the polypropylene outer layer, where the printed décor is located, along with the changes in the retort treatment cycle and the connected changes in heat and high humidity conditions in the packaging material. The visual contrast differences, i.e. printed décor defects, appear generally in stressed locations where the polymer has already been subject to stresses during forming and folding.

With heat treatment is meant any treatment for sterilizing purposes at an elevated temperature. The heat treatment may for example co-sterilize the package and package content, such as a food product, after filling of the package with the content.

The present disclosure thus provides a packaging material comprising a coated paperboard material for use in packages adapted for shelf-life extending heat treatment at elevated temperature. Examples of such shelf-life extending heat treatments are hot fill with subsequent pasteurisation or retort and steam autoclave treatments. Thus, the treatment is normally carried out at temperatures higher than 80° C. The heat treatment may for example co-sterilize the package and package content, such as food products.

According to some embodiments, the heat treatment is carried out at an overpressure and a temperature above 100° C., such as above 110 or 121° C., such as 121-140° C. Examples of packages adapted for shelf-life extending heat treatment with steam and/or water as the heat medium are those marketed under the name Tetra Recart®.

An alternative heat treatment method, to retort or autoclave treatment, for such sterilization, is a so-called "hot-fill with pasteurisation" treatment, which in addition to aseptic filling of a pre-heated and thus partly sterilised food product, maintains the filled and sealed package at an elevated temperature for prolonged heat treatment, such as at a temperature from 80 to 100° C. Such hot fill with pasteurisation treatments are suitable for delicate and sensitive food products, for which a retort treatment would constitute too harsh conditions. The maintaining of the package at the elevated temperature is done by forwarding the packages through a heat sterilisation tunnel, which is divided into several treatment zones, including a warming-up zone, a heat treatment zone and a cooling zone. The warming-up and heat treatment zones may be treating the packages with dry heat, i.e. with hot air, without steam, or with steam and/or with water that is sprinkled or flushed over the packages. The cooling is normally done by flushing the packages with cooling water. Most commonly, the hot fill pasteurisation temperature is regulated (warming up and cooling down) with water. Treatment temperatures and holding times are determined according to the specific needs depending on the packed food product.

The coated paperboard included in the packaging material of the first aspect, comprises a base board. The baseboard is a paperboard. The base board has a top side provided with a pigment coating. The top side is thereby adapted for printing, such as printing by flexography, offset and lithography. Accordingly, in one embodiment of the first aspect, the top side coated with the pigment coating may be printed. Further, the printed side may be covered by a heat-resistant, liquid barrier layer or coating, such as a plastic coating. Such a plastic coating may for example comprise polyethylene homo- or copolymers, polypropylene homo- or copolymers or polyesters, such as polyethyleneterephthalate (PET), or mixtures of any of these polymers.

The base board included in the packaging material may for example comprise at least two paper layers, such as two, three, four or five layers. In such case, the top paper layer of the base board is provided with the pigment coating. In one embodiment, the top paper layer of the base board is bleached. It may also comprise titanium dioxide for additional whitening. The bleached board is preferably formed from bleached Kraft pulp, such as a mixture of bleached hardwood sulphate pulp and bleached softwood sulphate pulp. In an alternative embodiment, the top layer may however be unbleached and obtained from, for example, unbleached Kraft pulp.

In an alternative embodiment, the base board is solid, which means that it is composed of only one paper layer.

As the reverse side of the coated paperboard is normally not printed, the bottom layer may be formed from unbleached pulp. However, the bottom layer may also be bleached. In a package, the reverse side normally faces the inside of the package.

The base board may be hydrophobized from a sizing agent treatment, such as treatment with alkyl ketene dimer (AKD), alkenyl succinic anhydride (ASA) or a combination thereof. Another example of a hydrophobic sizing agent is rosin size. If the base board comprises more than one layer, each layer may be hydrophobized from the sizing agent treatment.

The base board may for example have the following characteristics:
grammage (ISO 536) between 120 and 290 g/m$^2$, 190 and 250 g/m$^2$, such as between 210 and 250 g/m$^2$;
thickness (ISO 534) between 230 and 390 μm, such as between 255 and 325 μm; and/or density (ISO 534) between 600 and 900 kg/m$^3$, such as between 650 and 850 kg/m$^3$, such as between 680 and 810 kg/m$^3$, such as between 700 and 780 kg/m$^3$.

The pigment coating, coated onto the paperboard material, of the first aspect packaging material, comprises:
a pigment mixture;
at least one binder; and
a zirconium-based cross-linker.

The pigment mixture may for example amount to 75-95%, such as 80-88%, of the dry weight of the pigment coating. The at least one binder may for example amount to 10-20%, such as 12-18%, of the dry weight of the pigment coating. The zirconium-based cross-linker may for example amount to 0.3-3%, such as 0.6-1.5%, such as 0.75-1.0%, of the dry weight of the pigment coating.

The pigment mixture may consist of calcium carbonate and clay only. However, the pigment mixture can also, in addition to calcium carbonate and clay, comprise layered silicate mineral, hydrated magnesium silicate, titanium dioxide or satin white. The clay may be kaolin clay, such as delaminated kaolin clay. In one embodiment of the mixture, the calcium carbonate amounts to at least 50%, such as at least 60%, of the dry weight of the pigment mixture. In an alternative or complimentary embodiment, the clay amounts to at least 10%, such as at least 15%, of the dry weight of the weight of the pigment mixture. Clay and calcium carbonate together preferably amounts to at least 80%, such as at least 90%, of the dry weight of the pigment mixture.

The presence and quantity of zirconium in a coating layer may for example be detected by ESCA or XPS. In the experiments herein described, zirconium has been detected using X-ray Photoelectron Spectroscopy (XPS) which is a surface sensitive method for elementar analysis. The depth of analysis is in the outermost 2-10 nm of the surface, and is thus not a total bulk analysis. The amount of zirconium is close to the detection limit, 0.1 atomic percent, that is 0.4-0.6 weight-%.

The presence of the zirconium-based cross-linker in the pigment coating is particularly important when the pigment coating layer is to be printed and the resulting coated and printed paperboard is for use in a package that is heat treated with steam as the heat medium, in particular when the steam condenses on the package during the heat treatment.

The at least one binder is/are for example selected from the group consisting of co-polymers, acrylic resins, polyvinyl acetate, polyvinyl alcohol, proteins, and polysaccharides, such as starches. Preferably, the at least one binder is/are selected from synthetic co-polymers, such as acrylic co-polymers, styrene-butadiene co-polymers and methyl methacrylate-butadiene co-polymers. Most preferably, the at least one binder is a styrene/acrylate co-polymer. When the pigment coating composition is prepared, such a binder is added in the form of styrene/acrylate latex.

The zirconium-based cross-linker may for example be a zirconium carbonate, such as ammonium zirconium carbonate or potassium zirconium carbonate.

In embodiments of the first aspect, the pigment coating may further comprise at least one rheology modifier. The purpose of such an addition would be to adjust the viscosity of the pigment coating composition. If added, the at least one rheology modifier may for example amount to 0.05-2.0%, such as 0.1-1.0%, of the dry weight of the pigment coating.

The at least one rheology modifier may for example be CMC and/or an acrylic polymer, such as an alkali-swellable acrylate polymer or a hydrophobically modified alkali-swellable acrylate polymer. If the rheology modifier is CMC, it typically amounts to 0.5-2% of the dry weight of the pigment composition. If the rheology modifier is an acrylic polymer, it typically amounts to 0.05-0.5% of the dry weight of the pigment composition. Other examples of rheology modifiers are starch and polyvinyl alcohol.

In order to avoid unnecessary misunderstanding, it should be observed that the expression "rheology modifier" is taken to signify a substance capable of modifying the rheological properties of the printable coating to such an extent that the packaging material provided with the decorative artwork is sufficiently resistant to heat and moisture so as not to be destroyed during the heat treatment. The addition of such a rheology modifier thus has the advantage of providing the packaging material of the first aspect, with improved resistance to cracks and defects in the pigment coating layer itself.

One or more pre-coating layers may be provided between the top side of the base board and a pigment coating forming the print surface. It is not necessary that such a pre-coating layer includes the zirconium-based cross-linker and the above-mentioned pigment mixture.

A pre-coating layer preferably comprises:
a) a pigment or a pigment mixture, such as a mixture of 40-90 wt. % calcium carbonate and 10-60 wt. % clay;
b) at least one binder, such as any one of the binders discussed above, preferably a styrene/acrylate co-polymer;
c) optionally the zirconium-based cross-linker; and
d) optionally at least one rheology modifier, such as any one of the rheology modifiers discussed above, preferably an acrylic polymer.

The pigment or pigment mixture may for example amount to 75-95%, such as 80-88%, of the dry weight of the pre-coating layer. The at least one binder may for example amount to 10-20%, such as 12-18%, of the dry weight of the pre-coating layer. When included, the zirconium-based cross-linker may for example amount to 0.3-3%, such as 0.6-1.5%, such as 0.75-1.0%, of the dry weight of the pre-coating layer. When included, the at least one rheology modifier may for example amount to 0.05-2.0%, such as 0.1-1.0%, of the dry weight of the pre-coating layer.

The coat weight of the pigment coating forming the surface for printing may for example be 5-30 g/m², such as 8-30 m², such as 10-30 m², such as 17-23 g/m².

If a pre-coating layer is provided, the coat weight of the pigment coating forming the printing surface is preferably 5-15 g/m². In such case, the coat weight of the pre-coating layer is preferably 5-15 g/m².

The reverse side of the base board may also be provided with a coating. The reverse side coating may have the same composition as the above-mentioned pigment coating, which comprises the pigment mixture, the binder, the zirconium-based cross-linker and optionally the rheology modifier. However, as the reverse side is normally not printed, it may also be a coating lacking the zirconium-based cross-linker. Accordingly, in one embodiment the reverse side coating may comprise the pigment mixture, the binder and optionally the rheology modifier, but no zirconium-based cross-linker. In one embodiment, the reverse side coating has the same composition as the pre-coating layer. The coat weight of the coating on the reverse side may for example be of 1-30 g/m², such as 1-9 g/m², such as 3-8 g/m². A base board having a pigment coating also on the reverse side, will provide this side with equal properties as regards adhesion to and compatibility with adjacent polymer layers, as well as provide a reduced risk for cellulose fibre dust from the base board interfering with the printed decorative artwork, when winding a printed, but not yet laminated, paperboard onto storage reels for intermediate storage.

When base board is coated, the grammage increases. Accordingly, the coated paperboard of the first aspect may for example have a grammage (ISO 536) of 150-200 g/m², such as 200-320 g/m², such as 200-300 g/m², such as 220-270 g/m². Further, the coated paperboard may have a thickness (ISO 534) of 200-400 µm, such as 230-400 µm, such as 255-325 µm and/or a density (ISO 534) of 700-950 kg/m³, such as 800-920 kg/m³, such as 800-880 kg/m³, such as 820-890 kg/m³, such as 820-860 kg/m³.

In order to avoid any misunderstanding, it should be observed that the expressions "paper" or "base board", "carton" or "paperboard material" is in a broad sense intended to encompass various cellulose-based bulk-providing materials, including thin, flexible, packaging papers as well as paper qualities of paperboard type.

A method of producing a coated paperboard as described in connection with the packaging material of the first aspect of the invention, comprises applying a pigment coating composition on a top side of a base board. The pigment coating composition is preferably water-based and comprises a pigment mixture, at least one binder, a zirconium-based cross-linker and optionally a rheology modifier. The components of the coating composition are discussed and exemplified above. The viscosity of the pigment coating composition is preferably 200-2000 mPa*s, such as 270-1800 mPa*s, measured at 23° C. with a rheometer, such as the Paar Physica UDS 200 in cup-bob C25 geometry at 25s-1 constant shea. The pigment coating composition may be applied directly on the top side of the base board. Alternatively, the pigment coating composition is applied on top of a previously applied coating layer, which may lack the zirconium-based cross-linker, as discussed above. The method of producing a coated paperboard may further comprise the step of applying a coating on a reverse side of the base board. Such a reverse side coating may also lack the zirconium-based cross-linker, as discussed above.

According to an embodiment, the packaging material is further printed with a decorative artwork of printing ink on the top side of the paperboard material, which is coated with the pigment coating. The printing inks used are conventional inks used in flexography, offset and lithography printing processes, and according to a preferred embodiment water-based flexographic inks.

According to an embodiment, the paperboard material has a recurring pattern of crease lines, which is aligned in register with the decorative artwork of printing ink. Such crease lines ensure folding of the packaging material along well-defined folds, and thus will eventually define the shape and appearance of a fold-formed package from the packaging material. Of course, when the folded edges and corners do not coincide with the printed decorative artwork to be shown to the exterior of the package, such that folds and printed surfaces are misaligned, the combined appearance of the packaging container will be bad, i.e. the decor will be distorted and confusing to consumers.

According to yet another advantageous embodiment, the packaging material further includes at least one layer serving as a gas barrier, such as an aluminium foil. The thickness of such an aluminium foil may be from 5 to 12 µm, such as 5-10 µm. If the packaging material according to the present invention is intended for a heat sterilizable or retortable package for particularly oxygen gas-sensitive foods, the packaging material may thus be provided with at least one layer which serves as gas barrier and which possesses the desirable tightness properties vis-à-vis oxygen gas. Examples of materials possessing such tightness properties may be so-called gas barrier polymers, such as for example ethylene vinyl alcohol copolymer (EVOH) and polyamide (PA). According to further embodiments, such layers may be vapour deposition coated layers, such as SiOx coatings or other metal(oxide) coatings, or dispersion or solution coated polymer layers, such as polyvinylalcohol (PVOH), water dispersible ethylenevinyl alcohol (EVOH), starch and starch derivatives, cellulose or cellulose derivatives or other polysaccharides or their derivatives. Preferably however, this layer consists of an aluminium foil which is laminated to the packaging material between the paper layer and one of the two outer heat-resistant coatings of plastic. An aluminium foil also affords the advantageous property that it renders the packaging material thermosealable by induction sealing which is a rapid, reliable and efficient sealing technology. According to one embodiment, the packaging material comprises a combination of two or more layers of such gas barrier materials, i.e. an aluminium foil and in addition a polymer layer or a coating having inherent gas barrier properties.

According to an embodiment, the packaging material of the present disclosure has outermost heat-resistant coatings of plastics, which further have barrier properties towards liquids (towards liquid or wet food products, as well as towards wet storage and handling conditions), on both sides of the packaging material. Practical examples of plastics which may be employed for the outer, heat-resistant coatings in the packaging material according to the present invention may be thermoplastics, such as high density polyethylene (HDPE), linear low density polyethylene (LLDPE), medium density polyethylene (HDPE), polypropylene (PP) homo- or copolymers and polyesters, such as for example polyehtyleneterephthalate (PET). Such outermost layers may have a thickness from 20 to 45 g/m2, such as from 20 to 40 g/m2. Also outer layers of low density polyethylene (LDPE) or blends of metallocene-catalysed linear low density polyethylene (mLLDPE) with LDPE, are conceivable according to embodiments of the packaging material, when the heat treatment temperatures are lower, such as from 80 to 100° C. Such outermost layers may have a thickness from 10 to 60 μm, such as from 20 to 40 μm.

According to a further embodiment, it is preferred that an aluminium foil is laminated to the coated paperboard material by means of an interjacent bonding layer of plastics. Such interjacent bonding layers may be a thermoplastic polymer such as a homo- or copolymer of polyethylene or a homo- or copolymer of polypropylene, or further a thermoplastic polymer having gas barrier properties, when barrier needs are high and cost restrictions are low. The interjacent bonding layer may be binding the paperboard and the aluminium foil directly to each other, such as would generally be the case with polyolefins. Such an interjacent bonding layer of polyolefin has a thickness from 15 to 35 g/m2, such as from 20 to 35 g/m2. Alternatively, the interjacent bonding layer may be binding the paperboard and the aluminium foil to each other by means of further interjacent thin layers of tie or adhesive polymers, such as polyolefin copolymers with monomers having carboxylic acid functionality, such as for example monomers having (meth) acrylic acid or maleic anhydride functionality.

According to a second aspect of the present invention, there will be realised a package adapted for a sterilizing heat treatment, which is produced by forming and thermo-sealing of the packaging material of the first aspect, as described above. More specifically, there is provided a package adapted for a sterilizing heat treatment, comprising the coated paperboard material as defined in the packaging material of the first aspect.

According to an embodiment, the package is adapted for heat treatment that takes place at an elevated temperature, which is above 80° C., such as above 90° C., such as above 100° C., for a determined time, depending on the food product to be packaged.

In a particular embodiment, there is provided a package which is adapted for co-sterilization of the package and its contents.

In a further embodiment of the package of the second aspect, such a package is provided, which is adapted for a shelf life extending heat treatment using steam, water or a steam/water mixture as the heating medium.

According to a preferred embodiment, a retortable package is provided by forming and thermo-sealing the packaging material of the first aspect. In another embodiment, such a retortable package is provided, which comprises a pigment coated paperboard material adapted for printing by flexography, offset or lithography printing techniques.

According to a third aspect of the present invention, there will be realised a method of producing a packaging material including a coated paperboard material, comprising applying a pigment coating composition on a top side of a base board, wherein the pigment coating composition comprises a pigment mixture, at least one binder and a zirconium-based cross-linker. In a further step, the coated paperboard material is laminated to outermost layers of plastics. In further embodiments, the method comprises providing the coated paperboard materials, including pigment coating composition components, as defined in connection with the first aspect above.

In a further embodiment, the method comprises a subsequent step, after applying the pigment coating composition, of providing the coated paperboard material with a decorative artwork by a printing technique. In a further embodiment, the method further comprises a step of providing the coated paperboard material with a recurring pattern of crease lines in register with the printed decorative artwork.

In a further embodiment, the coated paperboard material is laminated to a layer serving as a gas barrier layer, such as preferably an aluminium foil. Preferably, the paperboard material is laminated to the gas barrier layer by means of melt extrusion laminating the layers to each other with an interjacent layer of thermoplastics.

In yet a further embodiment, the method of producing the packaging material comprises a step of applying outermost heat resistant layers of plastics, by means of melt extrusion coating onto a web comprising the coated paperboard material.

Thus, the method in a broad sense comprises the steps of providing a web of paper whose one surface has a printable coating of pigment, binder and a zirconium-based cross-linker, providing the printable coating with optional decorative artwork of printing ink, and further coating the web provided with decorative artwork, with outer, heat-resistant coatings of plastic on both sides of the web.

In one practical embodiment of the method according to the present invention, the web provided with decorative artwork is provided with a pattern of crease lines in register with the decorative artwork in order to facilitate fold forming of the packaging material when it is to be reformed into packages.

In a further practical embodiment of the method according to the present invention, the web provided with decorative artwork and crease lines is supplemented with at least one additional layer of a material possessing superior tightness properties vis-à-vis gases, in particular oxygen gas. Examples of such oxygen gas-tight materials may be ethylene vinyl alcohol copolymers (EVOH) and polyamide (PA), but preferably use is made of an aluminium foil, Alifoil, which is laminated to the web between the paper or paperboard layer and one of the two outer coatings of plastic. An aluminium foil affords the advantage that it renders the packaging material thermosealable by induction heating, which is a rapid, reliable and efficient sealing technology on reforming of the packaging material into finished packages.

BRIEF DESCRIPTION OF THE ACCOMPANYING DRAWINGS

Figure 1B:
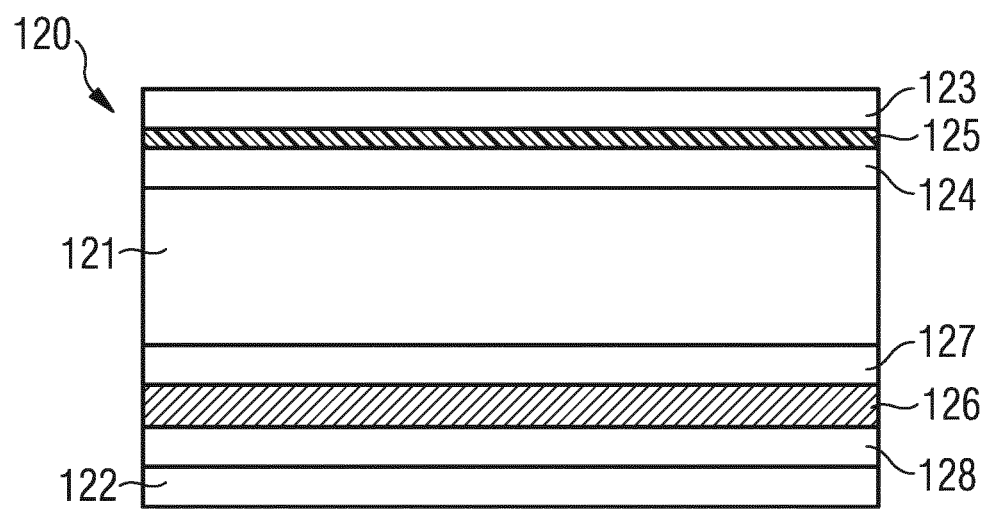
Figure 2A:
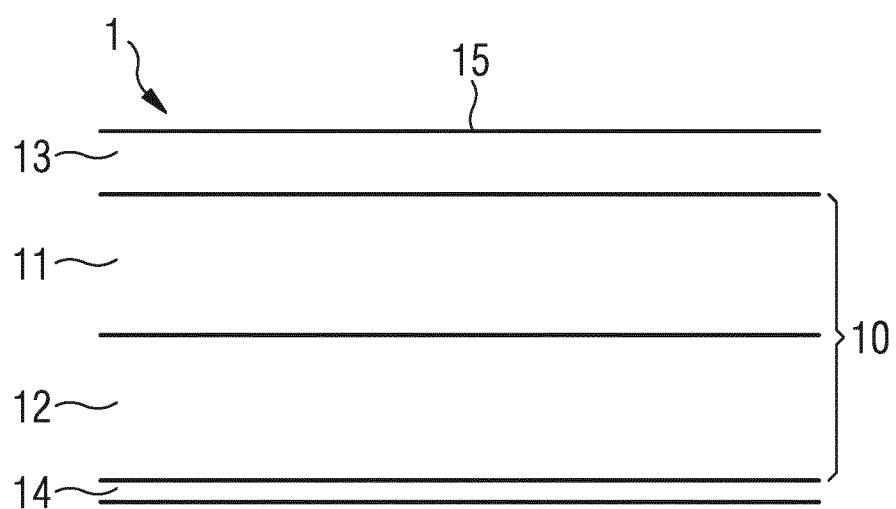
Figure 2B:
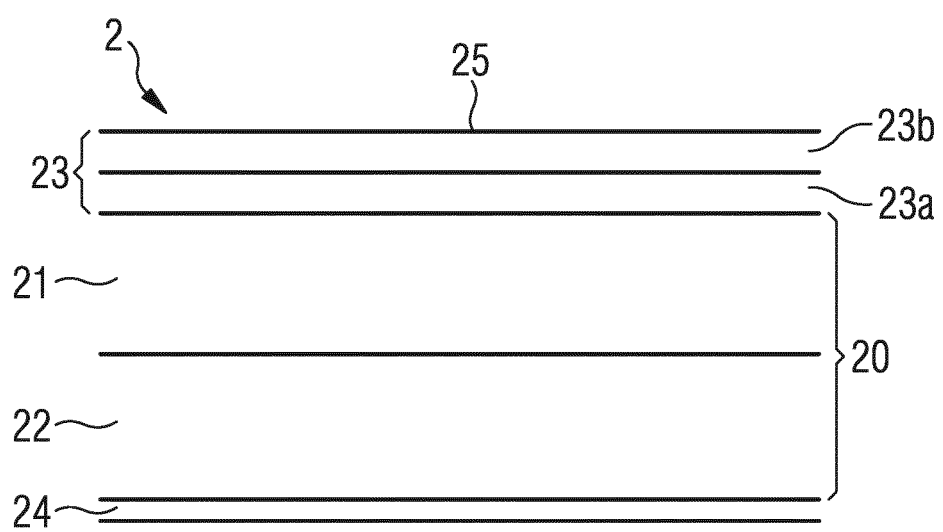
Figure 3A:
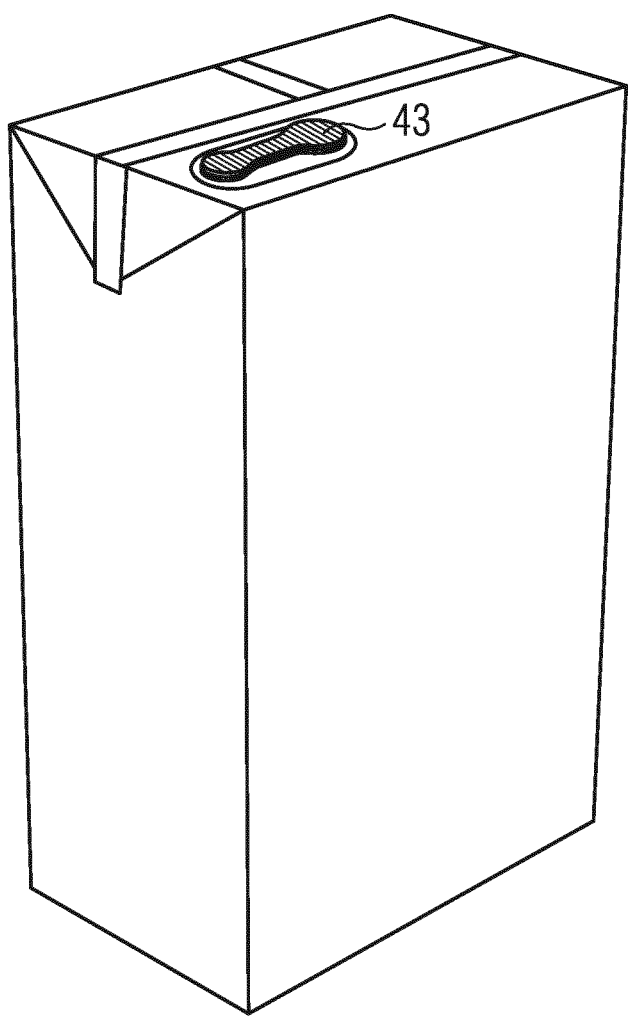
Figure 3B:
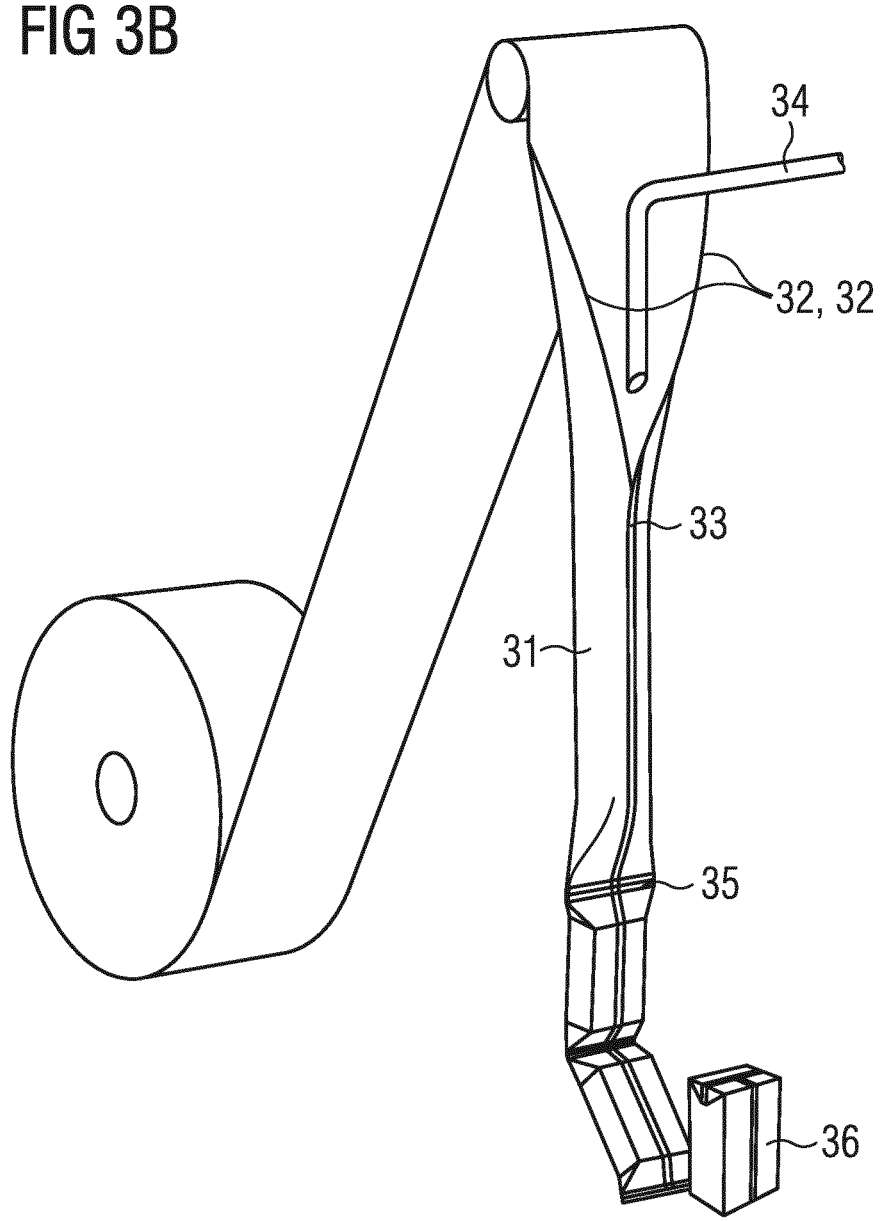
Figure 4A:
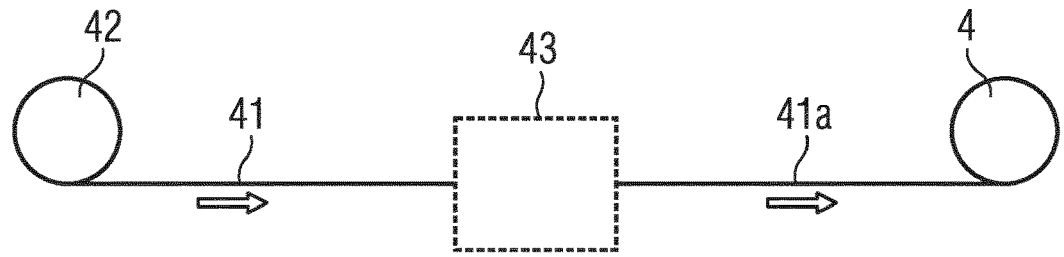
Figure 4B:
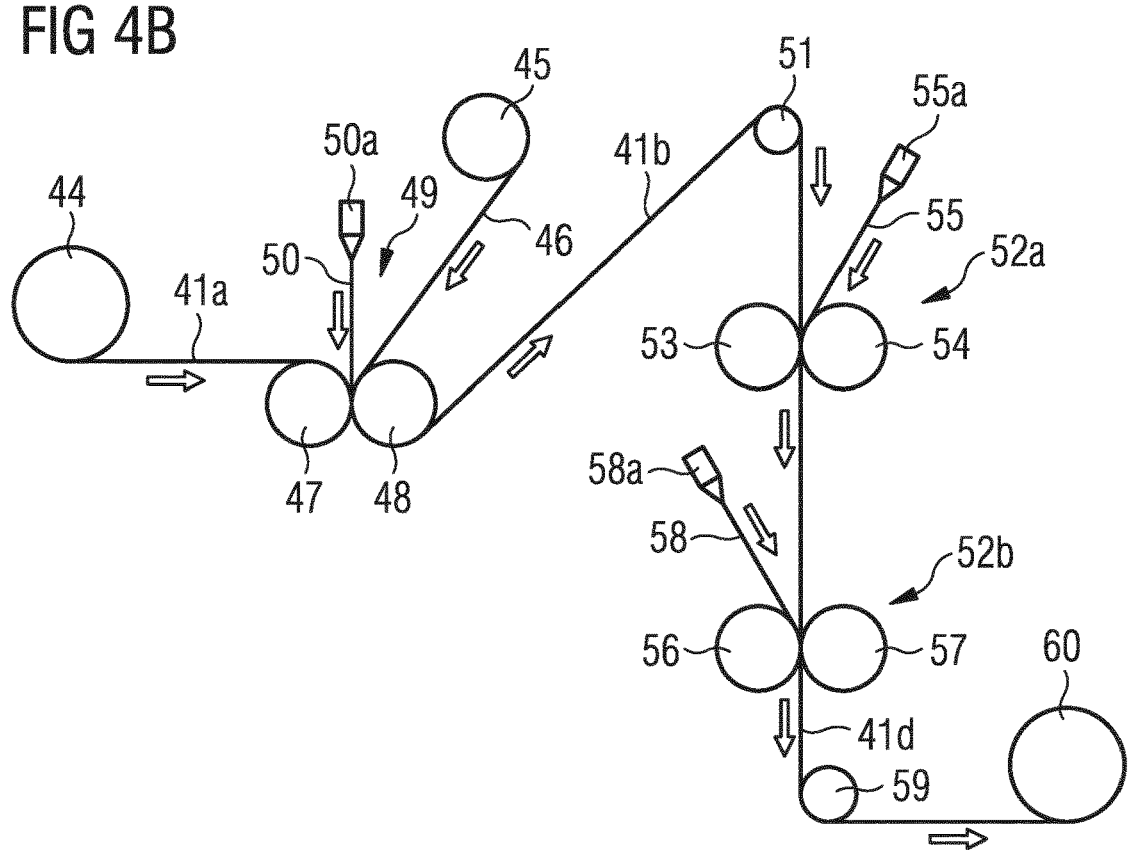
Figure 4C:
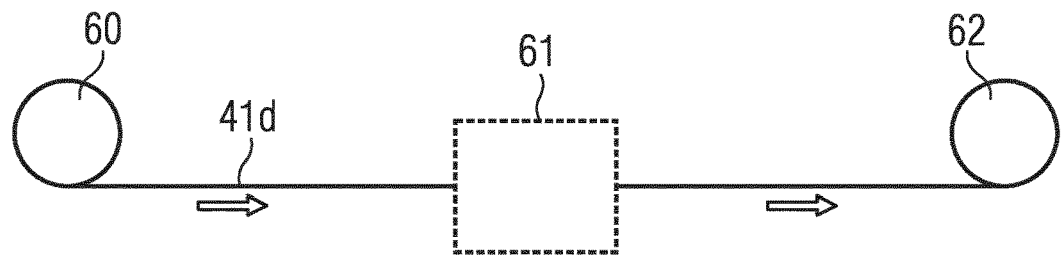

The present invention will now be described in greater detail hereinbelow, with reference to the accompanying Drawings. In the accompanying Drawings:

FIGS. 1a and 1b each schematically illustrate a cross section of a packaging material according to a first and second embodiment, comprising a pigment-coated paperboard material layer;

FIGS. 2a and 2b each schematically illustrate a cross section of a first and second embodiment of a pigment-coated paperboard material layer to be incorporated into any one of the packaging material embodiments of FIG. 1 and FIG. 2;

FIGS. 3a, and 3c each schematically illustrate an embodiment of a packaging container to be manufactured from the packaging material of FIG. 1a or 1b;

FIG. 3b schematically describes the principle of forming, filling and sealing of general packages of the type as i.a. shown in FIG. 3a, and FIG. 4A-4C schematically illustrate a per se known method of producing a packaging material, FIG. 4A showing a first part of the method for various introductory processing operations; FIG. 4B shows a second part of the method for lamination operations, and FIG. 4C shows a third or finishing part of the method for further mechanical processing operations.

DESCRIPTION OF PREFERRED EMBODIMENTS AND DETAILED DESCRIPTION OF THE ACCOMPANYING DRAWINGS

Thus, FIG. 1a is a schematic cross section of a non-limiting example of a retortable packaging material according to a first embodiment of the present invention. The packaging material, which has been given the generic reference numeral 110, has a rigid, but foldable core layer 111 of paper, as well as outer heat-resistant layers or coatings 112 and 113, respectively on both sides of the core layer.

In order to render the packaging material printable such that it, in a simple manner using prior art technology and prior art equipment, may be printed with optional decorative artwork of printing ink, the side of the core layer 111 intended for printing in the packaging material 110 according to the present invention carries a printable coating 114. The pigment coating 114 comprises a pigment mixture, at least one binder and a zirconium-based cross-linker. The pigments mixture comprises at least 40 wt-% calcium carbonate, and at least 10 wt-% kaolin clay, such as delaminated kaolin clay, and is added at 75-95 wt-% of the dry pigment coating. The binder is a styrene/acrylate copolymer added at 10-20 wt-% of the dry coating. The zirconium-based cross-linker is an ammonium zirconium carbonate or a potassium zirconium carbonate, added at an amount of from 0.3 to 3 wt-% of the dry coating. In order to achieve optimal viscosity properties of the pigment coating, an acrylic copolymer rheology modifier, such as an alkali-swellable acrylate polymer (ASE), or CMC (carboxymethyl cellulose) may be added at a low amount of from 0.02 to 2.0 wt-% of the dry pigment coating.

In order not to conceal the decorative artwork 115 of printing ink printed on the printable layer 114 of the core layer 111, the outer heat-resistant layer or coating 113 of the packaging material should be transparent, so that the subjacent decorative artwork 115 will be clearly visible and apparent on visual inspection from the decorative side of the packaging material 110.

Usable materials for the outer, heat-resistant, transparent coating 113 may be selected from the group essentially comprising high density polyethylene (HDPE), linear low density polyethylene (LLDPE), medium density polyethylene (MDPE), polypropylene (PP) homo- and copolymers, and polyesters, such as polyethylene terephthalate (PET). The outer coating 113 is preferably polypropylene of a thickness from 20 to 45, such as from 25 to 35 g/m2.

Correspondingly, usable materials for the heat-resistant outer coating 112 on the other side of the packaging material 110 may also be selected from the group essentially comprising high density polyethylene (HDPE), linear low density polyethylene (LLDPE), medium density polyethylene (MDPE), polypropylene (PP) homo- and copolymers, and polyesters, such as polyethylene terephthalate (PET). A good working example of such outer heat-resistant layers, 112 and 113 are (PP) polypropylene layers, which are applied by means of melt extrusion coating to a web substrate comprising the printed and laminated core, paperboard material, layer 111. The outer coating 112 then has a thickness from 20 to 40, such as from 25 to 35 g/m2.

In a specific embodiment, the printable coating may contain a binder of a styrene acrylic copolymer in an amount of 10-20%; a pigment mixture comprising clay and calcium carbonate in an amount of 80-90%; and a rheology modifier in an amount of 0.1-1%, all percentage weight proportions being based on the total weight of the composition. Further, a zirconium carbonate cross-linker is added at an amount of from 0.6 to 1.5 wt-% of the dry coating. In order to achieve optimal viscosity properties of the pigment coating, an acrylic copolymer rheology modifier, such as an alkali-swellable acrylate polymer, is added at a low amount of from 0.1 to 1.0 wt-% of the dry pigment coating.

FIG. 1b is a schematic cross section of a non-limiting example of a retortable packaging material according to a second embodiment of the present invention. The packaging material, which has been given the generic reference numeral 120, has a rigid, but foldable core layer 121 of paper or paperboard, as well as outer heat-resistant layers or coatings 122 and 123, respectively, on both sides of the core layer 121.

In order to render the packaging material 120 printable so that, in a simple manner using prior art techniques and prior art equipment, it may be printed with optional decorative artwork of printing ink, the side of the core layer 121 intended for printing in the packaging material 120 according to the invention has a printable pigment coating 124. The printable pigment coating 124 comprises a pigment mixture, at least one binder and a zirconium-based cross-linker. The pigments may be a mixture comprising at least 40 wt-% calcium carbonate, and at least 10 wt-% kaolin clay, such as delaminated kaolin clay, and are added at 80-90 wt-% of the dry pigment coating. The binder is a styrene/acrylate copolymer added at 12-18 wt-% of the dry coating. The zirconium-based cross-linker is an ammonium zirconium carbonate or a potassium zirconium carbonate, added at an amount of from 0.6 to 1.5 wt-% of the dry coating. In order to achieve optimal viscosity properties of the pigment coating, an acrylic copolymer rheology modifier, such as an alkali-swellable acrylate polymer, may be added at a low amount of from 0.1 to 1.0 wt-% of the dry pigment coating.

In order not to conceal decorative artwork 125 of printing ink printed on the printable coating 124 of the core layer 121, the outer, heat-resistant layer or coating 123 of the packaging material 120 should be transparent so that the subjacent decorative artwork 125 will be clearly visible and apparent on visual inspection from the decorative artwork side of the packaging material 120.

Usable materials for the heat-resistant transparent coating 123 may be selected from the group essentially comprising high density polyethylene (HDPE), linear low density polyethylene (LLDPE), medium density polyethylene (MDPE), polypropylene (PP) homo- and copolymers, and polyesters, such as polyethylene terephthalate (PET). The outer coating 123 is preferably polypropylene of a thickness from 20 to 45, such as from 25 to 35 g/m2.

Correspondingly, usable materials for the heat-resistant outer coating 122 of the other side of the packaging material 120 may also be selected from the group essentially comprising high density polyethylene (HDPE), linear low density polyethylene (LLDPE), medium density polyethylene (MDPE), polypropylene (PP) homo- and copolymers, and polyesters, such as polyethylene terephthalate (PET). A good working example of such outer heat-resistant layers, 112 and 113 are (PP) polypropylene layers, which are applied by means of melt extrusion coating to a web substrate comprising the printed and laminated core, paperboard material, layer 111. The outer coating 122 then has a thickness from 20 to 40, such as from 25 to 35 g/m2.

The packaging material 120 according to the second embodiment in FIG. 1b differs from the packaging material according to the first embodiment in FIG. 1a in that it has a layer 126 serving as gas barrier on that side of the core layer 121 which is turned to face away from the printable coating 124 of the core layer 121. On the one side, the gas barrier layer 126 is bonded to the core layer 121 by the intermediary of an interjacent layer 127 of a thermoplastic bonding polymer and on the other side to the heat-resistant outer coating 122 by the intermediary of a similarly interjacent layer 128 of a thermoplastic bonding polymer, such as an adhesive polyolefin-based polymer having carboxylic functional bonding groups or sites. The interjacent bonding layer is preferably a layer of polyolefin, such as polypropylene, and then has a thickness from 15 to 35 g/m2, such as from 20 to 35 g/m2. A further interjacent layer 128 of a functionalised adhesive polymer may be used at a thickness from about 3 to 8 g/m2.

The layer 126 serving as gas barrier may be a barrier polymer of per se known type, such as for example ethylene vinyl alcohol copolymer (EVOH) or polyamide (PA). Preferably however, the layer 126 consists of an aluminium foil, Alifoil, which also affords the advantageous property that it renders the packaging material thermosealable by induction sealing which is a rapid, reliable and efficient sealing technology on reforming of the packaging material into retortable packages by fold forming and thermosealing.

FIG. 2a shows a non-limiting embodiment of a coated paperboard 1 according to the present disclosure. The coated paperboard 1 comprises a base board 10 composed of a top layer 11 and a bottom layer 12. The top layer 11 is made from bleached Kraft pulp. The bottom layer 12 is made from unbleached pulp. A top side of the base board 10 is provided with a top pigment coating layer 13 comprising a pigment mixture of $CaCO_3$ and clay, a styrene/acrylate co-polymer acting as a binder, an acrylic rheology modifier (thickener) and ammonium zirconium carbonate acting as a cross-linking agent. A bottom side of the base board 10 is provided with a bottom pigment coating layer 14, which also comprises the pigment mixture, the binder and the thickener, but lacks cross-linking agent. The top pigment coating layer 13 is adapted to maintain the quality of a print on its top surface 15 during sterilizing heat treatment at elevated temperature, in particular retort sterilization.

FIG. 2b shows another non-limiting embodiment of a coated paperboard 2 according to the present disclosure. The coated paperboard 2 comprises a base board 20 composed of a top layer 21 and a bottom layer 22. The top layer 21 is made from bleached Kraft pulp. The bottom layer 22 is made from of unbleached pulp. A top side of the base board 20 is provided with a top pigment coating layer 23, which comprises two sub-layers; a base layer 23a and a top layer 23b. The top layer 23b comprises a pigment mixture of $CaCO_3$ and clay, a styrene/acrylate co-polymer acting as a binder, an acrylic rheology modifier (thickener) and ammonium zirconium carbonate acting as a cross-linking agent. The base layer 23a comprises the pigment mixture, the binder and the thickener, but lacks cross-linking agent. A bottom side of the base board 20 is provided with a bottom pigment coating layer 24, which comprises the same components as the base layer 23a. The top layer 23b is adapted to maintain the quality of a print on its top surface 25 during retort sterilization.

FIG. 3a shows one embodiment of a packaging container produced from the packaging material of the present disclosure, i.e. a package produced by continuously forming, filling and sealing a tube formed from a web of the packaging material with a liquid or semi-liquid food product, such as a Tetra Brik® Aseptic packaging container. Such a container may be filled, formed and sealed to be further subject to sterilization treatment in an autoclave or retort, in order to sterilize the food contents together with the package. Alternatively, such a packaging container may be filled with a hot, already partly heat treated food product, which also after filling is maintained at elevated temperature for a determined period of time, until the filled and sealed package with its contents may be considered to be fully sterile. Such so-called "hot fill with pasteurisation" treatment often is carried out by heat treatment of the filled and sealed packages at a temperature from 80 to 100° C.

FIG. 3b shows the principle of forming, filling and sealing packages as described in connection with FIG. 3a, and as also described in the introduction of the present application, i.e. a web of packaging material is formed into a tube 31 by the longitudinal edges 32 of the web being united to one another in an overlap seam, 33, by melting together the mutually facing surfaces of the plastic layers 112; 122 and 113; 123. The tube is filled 34 with the intended liquid or semi-liquid food product and is divided into contiguous pillow-shaped individual packages by repeated transversal seals 35 of the tube at a pre-determined distance from one another below the level of the filled contents in the tube. The transversal seals 35 are thus formed by repeated pressing-together and heat-sealing of the tube transversely with respect to the longitudinal direction of the tube through the filled liquid or food content. The packages 36 are separated by incisions in the transversal seals and are given the desired geometric configuration, usually by fold formation along prepared crease lines in the material, into a cuboid or parallelepipedal shape by means of at least one further fold-forming and heat-sealing step. A well-known example of a single-use package of this type is the commercial package sold under the name Tetra Brik® Aseptic. The packaging container is particularly suitable for beverages, sauces, soups or the like. Typically, such a package has a volume of about 100 to 1000 ml. It may be of any configuration, but is preferably parallelepipedal, having longitudinal and transversal seals 33 and 35, respectively, and optionally an opening device.

In another embodiment, not shown, a packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

Such packaging containers, as described above in FIG. 3*a* and in connection with FIG. 3*b*, can also be provided with a suitable opening arrangement, for example a screw cap which, when opened, penetrates and removes the packaging material and permits emptying of the packaged product. For this purpose, the laminated packaging laminate can have perforations in the paperboard layer that has been laminated in between the polymers and barrier layers of the laminate. Alternatively, a hole is punched in the laminated packaging material immediately before the filling process, after which the hole is provided with a tape or pull-tab, on both sides of the packaging material. After the packaging container has been filled and sealed, an opening arrangement in the form of a hinge or screw cap can be applied on top of the covered hole. Alternatively, an opening arrangement is applied which is cast onto a punched hole directly during the filling process. It is not necessary to provide the packaging container with an opening device, it can also be torn open by means of a tear perforation, or by cutting.

According to a further embodiment, packaging containers can be produced as above but retain, as their final shape, the pillow shape that is obtained directly after the packaging units have been separated from each other and are therefore not further shaped by folding. Also such packages may be heat sterilised after filling, together with the filled food product, and therefore need to have the characteristics of the present disclosure. Such a package is generally produced using a thin paperboard or paper material and therefore entails great demands on adhesion and integrity of the packaging material with regard to the lamination layers and also to the mechanical strength characteristics, in particular the elastic characteristics, of the polymer layers.

Normally, such a package is not dimensionally stable enough to form a cuboid or wedge-shaped packaging container, and is not fold formed after transversal sealing. It will thus remain a pillow-shaped pouch-like container and be distributed and sold in this way.

FIG. 3*c* shows another preferred embodiment of a packaging container produced from the packaging material of the present disclosure, i.e. a package produced by the intermittent forming, filling and sealing of pre-cut package blanks, such as a retortable Tetra Recart® packaging container, intended for subsequent autoclave or retort heat sterilization treatment.

The illustrated packaging container is thus a substantially cuboid or parallelepipedic packaging container of the type which is found on the market under the name Tetra Recart®.

The packaging container is produced from a prefabricated flat folded packaging blank of a packaging laminate according to the present disclosure, which packaging blank is first fold-formed into an open tubular container carton by forming a longitudinal seal by overlapping opposed edges of the blank. The one end (e.g. the bottom end) of the tubular container carton is sealed by fold forming and thermosealing of the corresponding end panels of the tubular container carton for the formation of a liquid-tight substantially planar bottom closure. The container carton thus provided with a bottom is subsequently filled with the relevant food, and the other end of the filled container carton is sealed by an additional fold forming and thermosealing of the corresponding end panels of the container carton for the formation of a liquid-tight substantially planar top seal 410, as shown in FIG. 3*c*.

FIGS. 4A, 4B and 4C together schematically illustrate a per se known method of producing a packaging material. The prior art method comprises, in the illustrated example, a first production line (FIG. 4A) for various introductory mechanical production processes, a second production line (FIG. 4B) for necessary coating- and lamination operations, and a third or finishing production line (FIG. 4C) for further mechanical processing operations.

In FIG. 4A, a web 41 of paper is unwound from a magazine reel 42 at the left-hand side of the figure. The web 41 is led in the direction of the arrow to a first processing station at 43 where the one surface of the web is provided with optional decorative artwork of printing ink by suitable printing technique, e.g. flexography, offset printing, lithography etc. Such printing techniques are well-known to a person skilled in the art and therefore require no further detailed description. At the same processing station 43, or in immediate association therewith, the web 41 is also provided with a pattern of crease lines which are applied on the web 41 in register with the decorative artwork of the web 41.

From the processing station 43, the web 41*a* thus provided with decorative artwork and crease lines is led further for winding up and intermediate storage on a storage reel 44 to the right in FIG. 4A.

The storage reel 44 is transferred to the second production line as shown in FIG. 4B. From the storage reel 44 to the left in the figure, the web 41*a* provided with decorative artwork and crease lines, is unwound and led to and converged with an aluminium foil 46 unwound from a magazine reel 45 at the nip between two rotary rollers 47 and 48 at a lamination station 49. The web 41*a* and the aluminium foil 46 are led together through the nip at the same time as a molten polymer binder 50 is extruded between them by an extruder device (not shown) through an extrusion die 50*a*.

From the lamination station 49, the laminated web 41*b* is led via one or more bending rollers 51 to a first coating station at 52*a* where the web 41*b* is led through the nip between two rotary rollers 53 and 54 at the same time as one side of the web is coated with an outer, heat-resistant layer 55, which is extruded on the web by means an extruder device (not shown) through an extrusion die 55*a*. From the first coating station 52*a*, the thus laminated coated web 41*c* is forwarded to a second lamination station 52*b*, where the web 41*c* is led through the nip between two rotary rollers 56 and 57 at the same time as the other side of the web is coated with an outer, heat-resistant layer 58, which is extruded on the web by means an extruder device (not shown) through an extrusion die 58*a*. In an alternative embodiment of the method, the laminated web 41*b* may be coated with the outer heat resistant layers in the other order, i.e. first in a coating station 52*b*, wherein the outer layer 58 is applied, and subsequently in a second coating station 52*a*, wherein the outer layer 55 is applied. From the final coating station, 52*b*, or if applicable 52*a*, the coated and laminated web 41*d* is led via one or more bending rollers 59 for further winding up and intermediate storage on a reel 60.

The storage reel 60 is transferred to the third production line as shown in FIG. 1C. From the storage reel 60, the web 41*d* is unwound and led to one or more additional mechanical processing stations (schematically illustrated at 61) where the web 41*d* is subjected to the possibly needed trimming, repair and fine tuning operations before the web 41 is finally wound up on a finished, customer-adapted magazine reel 62.

In order to make possible production of a well-functioning, well-decorated packaging material in the manner described above, the side of the web intended for printing is, according to the present invention, provided with a printable pigment coating which includes pigment, a polymer binder, optionally a substance possessing the capacity to modify the rheological properties of the coating ("rheology modifier"), and a zirconium-based cross-linker.

EXAMPLES

In the examples, paperboard of the following characteristics was used:

| | |
|---|---|
| Number of layers | 2 |
| Grammage (ISO 536) | 225-245 g/m² |
| Thickness (ISO 534) | 290-320 µm |
| Density (ISO 534) | 740-800 kg/m³ |

The top layer was formed from a mixture of bleached hardwood sulphate pulp and bleached softwood sulphate pulp and the bottom layer was formed from a mixture of unbleached softwood sulphate pulp and pulped broke. The fibers of the pulps were mechanically treated with HC-refining and/or LC-refining (high/low consistency refining). The board was internally sized with AKD. Other paper chemicals used in board production was $TiO_2$, alum, bicarbonate, starch and BMA.

Pilot Coating Trials

The pilot coating trials were carried out in a pilot coating machine and the uncoated base board used was commercial uncoated board for liquid packaging, with the above characteristics intended for packages for heat sterilisation. In the pilot coating machine, the base board was pigment coated in two layers, 10 g/m² (pre-coating layer)+10 g/m² (top coating layer for printing), on the print/top side and also pigment coated in one layer, 5-8 g/m², on the reverse side. The various pigment coating compositions comprised a pigment mixture, a binder and a thickener/rheology modifier. The pigment mixture amounted to 85-87% of the dry weight of the coating composition. The binder amounted to 12-14% of the dry weight of the coating composition. In some of the pilot trials, the coating composition applied to the top/printing side further comprised an additive. In one case, only the top layer of the two pigment coating layers applied to the top/printing side of the board comprised the additive. When added, the additive amounted to 0.8-0.9% of the dry weight of the coating composition.

When included, the additive was either polyvinyl alcohol (PvOH) or ammonium zirconium carbonate (AZC). The specific PvOH product was Kuraray Poval 6-98 also known as Mowiol 6/98 from Kuraray Europe Nordic AB Oy and the specific AZC product was Zirlink from Brenntag Nordic AB. Although the trials in this case were performed with the ammonium zirconium carbonate product Zirlink, other chemistries based on the zirconium metal ion could have been used instead. Such other chemistries include, i.a., potassium zirconium carbonate products.

The pigment mixture in the trials comprised 5-40 wt. % delaminated kaolin clay ("Clay") and 60-95 wt. % calcium carbonate ("CaCO3")

The binder was either styrene-butadiene copolymer ("SB") provided as styrene-butadiene latex (Styron SB 94378) when the coating composition was prepared or styrene/acrylate co-polymer (SA) provided as styrene/acrylate latex (Styron SA 95085.01) when the composition was prepared.

The thickener was either an acrylate polymer (Coatex Rheocoat™ 66, "ASE") provided as an alkali swellable acrylate polymer emulsion when the coating composition was prepared or carboxy methylated cellulose (Finnfix 10 from CP Kelco Oy, "CMC"). When the acrylic thickener was added, it amounted to 0.2% of the dry weight of the coating composition. When CMC was added, it amounted to 0.8-0.9% of the dry weight of the coating composition.

Samples of the pigment coated paperboard from three pilot coating trials ("Pilot 1", "Pilot 2" and "Pilot 3") were provided and tested as described below.

Full Scale Trials

The full scale trials were carried out on a two layer paper machine with one bleached top layer and one unbleached bottom layer according to the characteristics above.

The base board was pigment coated on both sides in a coating section of the paper machine. A pre-coating layer (10 g/m²) and a top coating layer (10 g/m²) were applied to the print/top side and one layer of a lower coat weight (5-8 g/m²) was provided on the reverse side. The pigment coating compositions comprised the pigment mixture, the binder and one of the thickeners described above in connection with the pilot trials. The pigment mixture amounted to 85-86% of the dry weight of the coating compositions. The binder amounted to 13-14% of the dry weight of the coating compositions. When the acrylic thickener was added, it amounted to 0.2% of the dry weight of the coating composition. When CMC was added, it amounted to 0.9% of the dry weight of the coating composition.

In five out of six full scale trials, the top coating composition further comprised the additive AZC in an amount corresponding to 0.9% of the dry weight of the coating composition.

Samples of the pigment coated paperboard from six full scale trials ("F sc 1"-"F sc 6") were provided and tested as described below.

Testing

The yellowing of the above samples of pigment coated paperboard was analysed by measuring the optical property b* according to SS-ISO 5631-2 after the samples had been heat treated at 150° C. in an oven for one hour. A b* value below 6 was considered acceptable. Samples were also printed and print quality before lamination and retort was evaluated by visual inspection. The print quality before lamination was determined in accordance with the Tetra Pak global standard criteria for print quality evaluation in all packaging material production, including parameters such as dot gain, colour density etc Finally, sample material was laminated and packages were prepared and retorted.

The coated and printed paperboard was laminated to an aluminium foil of 9 µm thickness by melt extrusion lamination with an interjacent layer of polypropylene. The surface weight of the interjacent layer was about 25 g/m2. The paperboard was further laminated by melt extrusion coating with an outer, heat-resistant and transparent layer of a polypropylene polymer layer on the printed side, and further with an outer, heat-resistant and transparent layer of a polypropylene polymer layer on the other side (the package inside) of the aluminium foil. The polypropylene layer on the inside is applied by co-extrusion coating onto the aluminium foil, together with an interjacent, about 4 g/m2 thick, layer of an adhesive polymer, or a so-called "tie" layer of a polyolefin-based polymer having maleic anhydride functional binding groups. Layer thickness ranges to be added? The outer, heat-resistant and transparent layer of polypropylene polymer on the printed side, is applied by means of extrusion coating at an average temperature of 275° C. at a web speed of about 300-400 m/min, and at a surface weight of about 30 g/m2. The outer layer of polypropylene applied on the other side, the inside, of the packaging material was applied at a surface weight of about 35 g/m2.

Packaging containers were formed from the laminated packaging material, thermo-sealed, filled with water, and sealed as described above, and were subject to maximal severe retort treatment at up to 4 bars over-pressure with a total process time of up to about 2 hours. Steam and steam-water mixture was used for heating the packages during the retort cycle, and water was used for cooling the packages.

Delamination of ink in retorted packages was evaluated by visual inspection.

Out of 1000 packages, a maximum of 16% are allowed to have defects in the printed décor layer (decorative artwork) that can be described in the following general manner: Faintly visible to clearly visible, i.e. having defects of size up to around 4 mm long and 2 mm wide.

Out of 1000 packages, 0% are allowed to have defects that can be described in the following general manner: Clearly visible, i.e. having a size around 4-5 mm long and 4 mm wide. Non-allowable defects will thus lead to a judgement of the quality being "not acceptable".

It is believed that cohesive breakages within the printed décor layer, are resulting in visual contrast differences at stressed locations of the packaging material, such that these defects are seen on the packages after lamination and retort treatment.

The results are shown in the tables below.

TABLE 1

| Trial | Pigment mixt. pre-coating | | Pigment mixt. top coating | | Binder | Thickener | Additive |
| --- | --- | --- | --- | --- | --- | --- | --- |
| | Clay (%) | CaCO₃ (%) | Clay (%) | CaCO₃ (%) | | | |
| 1 Pilot 1 | 5 | 95 | 5 | 95 | SA | ASE | — |
| 2 Pilot 1 | 30 | 70 | 50 | 50 | SB | CMC | — |
| 3 Pilot 1 | 30 | 70 | 50 | 50 | SA | ASE | — |
| 4 Pilot 1 | 10 | 90 | 10 | 90 | SA | ASE | — |
| 5 Pilot 1 | 10 | 90 | 10 | 90 | SA | ASE | — |
| 6 Pilot 1 | 10 | 90 | 20 | 80 | SA | ASE | — |
| 7 Pilot 1 | 10 | 90 | 50 | 50 | SA | ASE | — |
| 8 Pilot 1 | 10 | 90 | 10 | 90 | SA | ASE | — |
| 9 Pilot 2 | 5 | 95 | 5 | 95 | SB | CMC | — |
| 10 Pilot 2 | 30 | 70 | 50 | 50 | SA | ASE | AZC |
| 11 Pilot 2 | 30 | 70 | 50 | 50 | SA | ASE | PvOH |
| 12 Pilot 2 | 5 | 95 | 5 | 95 | SB | ASE | — |
| 13 Pilot 2 | 30 | 70 | 50 | 50 | SA | CMC | PvOH |
| 14 Pilot 3 | 30 | 70 | 15 | 85 | SA | ASE | AZC |
| 15 Pilot 3 | 30 | 70 | 5 | 95 | SA | ASE | AZC |
| 16 Pilot 3 | 30 | 70 | 15 | 85 | SA | ASE | AZC |
| 17 Pilot 3 | 30 | 70 | 50 | 50 | SA | CMC | AZC |
| 18 F sc 1 | 30 | 70 | 50 | 50 | SA | CMC | — |
| 19 F sc 2 | 30 | 70 | 50 | 50 | SA | ASE | AZC |
| 20 F sc 3 | 30 | 70 | 5 | 95 | SA | ASE | AZC |
| 21 F sc 4 | 30 | 70 | 50 | 50 | SA | ASE | AZC |
| 22 F sc 5 | 30 | 70 | 15 | 85 | SA | ASE | AZC |
| 23 F sc 6 | 30 | 70 | 25 | 75 | SA | ASE | AZC |

TABLE 2

| | Trial | Yellowing after heat treatment | Delamination of ink in retorted packages | Print quality before lamination and retort |
| --- | --- | --- | --- | --- |
| 1 | Pilot 1 | Accept. | Not accept. | N/A |
| 2 | Pilot 1 | Significant | Accept. | N/A |
| 3 | Pilot 1 | Accept. | Not accept. | N/A |
| 4 | Pilot 1 | Accept. | Not accept. | N/A |
| 5 | Pilot 1 | Accept. | Not accept. | N/A |
| 6 | Pilot 1 | Accept. | Not accept. | N/A |
| 7 | Pilot 1 | Accept. | Not accept. | N/A |
| 8 | Pilot 1 | Accept. | Not accept. | N/A |
| 9 | Pilot 2 | Significant | Accept. | Not accept. |
| 10 | Pilot 2 | Accept. | Accept. | Accept. |
| 11 | Pilot 2 | Accept. | Not accept. | Not accept. |
| 12 | Pilot 2 | Significant | Accept. | Not accept. |
| 13 | Pilot 2 | Accept. | Accept. | Not accept. |
| 14 | Pilot 3 | Accept. | Accept. | N/A |
| 15 | Pilot 3 | Accept. | Accept. | N/A |
| 16 | Pilot 3 | Accept. | Accept. | N/A |
| 17 | Pilot 3 | Accept. | Accept. | N/A |
| 18 | F sc 1 | Accept. | Not accept. | N/A |
| 19 | F sc 2 | Accept. | Accept. | Accept. |
| 20 | F sc 3 | Accept. | Not accept. | Accept. |
| 21 | F sc 4 | Accept. | Accept. | Accept. |
| 22 | F sc 5 | Accept. | Accept. | Accept. |
| 23 | F sc 6 | Accept. | Accept. | Accept. |

As can be seen in the tables above, both "print quality before lamination and retort" and "delamination of ink after retort" were acceptable when AZC was added in the top side coating, provided that the amount of clay in the pigment mixture was higher than 5%. Here, acceptable delamination refers to insignificant delamination. In addition, no significant yellowing was obtained after heat treatment of samples having AZC added in the coating. Successful results were obtained with both types of rheology modifiers ("ASE" and "CMC"). However, the acrylic rheology modifier is generally considered to be preferred as CMC sometimes causes more yellowing. Further, CMC has been associated with more ink-delamination than the acrylic rheology modifier in one experiment.

It may also be concluded from the tables that an acrylic binder, in particular a styrene/acrylate co-polymer, is preferred.

Thus, packages may be produced from the packaging material using packing and filling machines which, from a web or from prefabricated blanks of the packaging material, form, fill and seal finished packages.

From, for example, a web, in some embodiments, packages are produced in that the web is first reformed into a tube by both longitudinal edges of the web being folded towards and united to one another in a mechanically strong sealing joint ("overlap joint"). The tube is filled with optional food and is divided into cushion-shaped packaging units by repeated transverse sealings of the tube transversely of the longitudinal direction of the tube and below the filling level of the tube. The packaging units are separated from one another by incisions in the transverse sealing zones and are given the desired geometric outer configuration, normally parallelepipedic, by an additional fold forming- and thermosealing operation.

Correspondingly, according to other embodiments, packages are produced from flat-folded and sealed tubular blanks of the packaging material. The flat-folded blank is raised to an open packaging carton whose one end (e.g. bottom end) is sealed by fold forming and thermosealing of the foldable bottom panels of the packaging carton. The packaging carton provided with a bottom is filled with food, whereafter the open end of the packaging carton (in this example the top end) is sealed by fold forming and thermosealing of the corresponding foldable top panels of the packaging carton.

INDUSTRIAL APPLICABILITY

A packaging material according to the present invention is intended for the production of retortable packages from the packaging material. In particular, retortable packages are provided that are obtained by fold forming and thermosealing of the packaging material. The packaging material is particularly intended for such packages for foods such as vegetables, pastes, soups, purées etc. Dog and cat food are also intended to be packed and stored in such retortable packages Many modifications are conceivable without departing from the spirit of the invention and the scope of the appended Claims.

What is claimed is:

1. A retortable packaging material that is formed, filled with contents and sealed to produce a retortable package that is subsequently co-sterilized together with the content by being subjected to heat treatment at elevated temperature, the retortable packaging material including a layer of a coated paperboard material, which is further laminated to outermost layers of plastics, wherein the coated paperboard material comprises a base board having a top side provided with a pigment coating to form a surface for printing, the top side of the base board coated with the pigment coating being printed with a decorative artwork of printing ink, the pigment coating comprising a pigment mixture, at least one binder and a zirconium-based cross-linker, wherein the pigment mixture comprises at least 40 wt-% calcium carbonate and at least 10 wt-% clay.

2. The retortable packaging material according to claim 1, wherein the coat weight of the pigment coating on the top side is 5-30 g/m².

3. The retortable packaging material according to claim 1, wherein the pigment mixture amounts to 75-95% of the dry weight of the pigment coating.

4. The retortable packaging material according to claim 1, wherein the at least one binder amounts to 10-20% of the dry weight of the pigment coating.

5. The retortable packaging material according to claim 1, wherein the zirconium-based cross-linker amounts to 0.3-3% of the dry weight of the pigment coating.

6. The retortable packaging material according to claim 1, wherein a pre-coating layer comprising pigment and a binder is provided between the top side of the base board and the pigment coating forming the surface for printing.

7. The retortable packaging material according to claim 1, wherein the base board is hydrophobized from a sizing agent treatment.

8. The retortable packaging material according to claim 1, wherein the pigment mixture comprises at least 50 wt. % calcium carbonate and at least 15 wt. % clay.

9. The retortable packaging material according to claim 1, wherein the at least one binder is/are selected from the group consisting of co-polymers, acrylic resins, polyvinyl acetate, polyvinyl alcohol, proteins, and polysaccharides.

10. The retortable packaging material according to claim 1, wherein the pigment mixture comprises at least 60 wt. % calcium carbonate, the at least one binder is an acrylic co-polymer and amounts to 12-18% of the dry weight of the pigment coating and the pigment coating comprises an acrylic rheology modifier.

11. The retortable packaging material according to claim 1, wherein the at least one binder is a styrene/acrylate co-polymer.

12. The retortable packaging material according to claim 1, wherein the zirconium-based cross-linker is a zirconium carbonate.

13. The retortable packaging material according to claim 1, further comprising at least one layer serving as a gas barrier.

14. The packaging material according to claim 1, further comprising at least one aluminium foil layer serving as a gas barrier.

15. The packaging material according to claim 1, wherein the zirconium-based cross-linker is a ammonium zirconium carbonate or potassium zirconium carbonate.

16. The retortable packaging material according to claim 1, wherein the pigment coating further comprises at least one rheology modifier.

17. The retortable packaging material according to claim 16, wherein the at least one rheology modifier amounts to 0.05-2.0% of the dry weight of the pigment coating.

18. The retortable packaging material according to claim 16, wherein the at least one rheology modifier is carboxy methyl cellulose (CMC) or an acrylic co-polymer.

19. A retortable package produced from the retortable packaging material according to claim 1.

20. A method for producing a packaging material including a coated paperboard material as defined in claim 1, comprising applying a pigment coating composition on a top side of a base board, wherein the pigment coating composition comprises a pigment mixture, at least one binder and a zirconium-based cross-linker, the pigment mixture comprising at least 40 wt % calcium carbonate and at least 10 wt % clay, and the method further comprising applying outermost layers of plastics.

21. A method according to claim 20, further comprising providing the coated paperboard material with a decorative artwork by a printing technique.

22. A method according to claim 20, wherein the coated paperboard material is laminated to a layer serving as a gas barrier layer, such as an aluminium foil.

* * * * *